(12) United States Patent
Kashiwa et al.

(10) Patent No.: US 7,414,827 B2
(45) Date of Patent: Aug. 19, 2008

(54) GAS-INSULATED SWITCHGEAR DEVICE

(75) Inventors: Takayuki Kashiwa, Hitachi (JP);
Ryoichi Shinohara, Hitachinaka (JP);
Takeru Yamamoto, Hitachi (JP);
Yoshiro Suzuki, Hitachiota (JP)

(73) Assignee: Japan AE Power Systems Corporation, Tokyo (JP)

( * ) Notice: Subject to any disclaimer, the term of this patent is extended or adjusted under 35 U.S.C. 154(b) by 51 days.

(21) Appl. No.: 11/616,150

(22) Filed: Dec. 26, 2006

(65) Prior Publication Data
US 2007/0153449 A1 Jul. 5, 2007

(30) Foreign Application Priority Data
Dec. 27, 2005 (JP) ............................. 2005-374304

(51) Int. Cl.
*H02B 1/20* (2006.01)
(52) U.S. Cl. .................. 361/612; 361/604; 361/605; 361/611; 218/90
(58) Field of Classification Search .................. None
See application file for complete search history.

(56) References Cited

U.S. PATENT DOCUMENTS

| | | | | | |
|---|---|---|---|---|---|
| 4,638,403 | A | * | 1/1987 | Amano et al. ................ | 361/612 |
| 5,373,415 | A | * | 12/1994 | Tawaratani .................. | 361/612 |
| 5,581,439 | A | * | 12/1996 | Hachida et al. ............. | 361/612 |
| 5,757,614 | A | * | 5/1998 | Hachida et al. ............. | 361/602 |
| 6,399,911 | B1 | * | 6/2002 | Tsuzura et al. ................ | 218/43 |
| 6,556,428 | B1 | * | 4/2003 | Takahoshi et al. ........... | 361/619 |
| 6,646,861 | B1 | * | 11/2003 | Watanabe et al. ........... | 361/612 |
| 6,664,493 | B2 | * | 12/2003 | Yamada et al. ............... | 218/43 |
| 6,727,454 | B2 | * | 4/2004 | Okabe et al. .................. | 218/43 |
| 7,075,778 | B2 | * | 7/2006 | Abe ........................... | 361/602 |
| 2002/0149904 | A1 | * | 10/2002 | Hachida et al. ............. | 361/605 |
| 2006/0215356 | A1 | * | 9/2006 | Takao et al. ................. | 361/612 |

FOREIGN PATENT DOCUMENTS

| | | | |
|---|---|---|---|
| JP | 0818218 A | * | 7/1996 |
| JP | 11-355923 | | 12/1999 |
| JP | 2003111222 A | * | 4/2003 |

* cited by examiner

*Primary Examiner*—Boris L Chervinsky
(74) *Attorney, Agent, or Firm*—Mattingly, Stanger, Malur & Brundidge, P.C.

(57) ABSTRACT

Disclosed is a gas-insulated switchgear device, in which a space for dismantlement and inspection work which facilitates the dismantlement and inspection work of circuit breakers at the time of the occurrence of accidents of the circuit breakers are provided and an installation area for the gas-insulated switchgear device can be reduced.

The gas-insulated switchgear device includes a pair of spaced apart main bus lines, three circuit breakers connected between the main bus lines, a common space for dismantlement and inspection work provided between two of the three circuit breakers, and branch bus lines provided above the common dismantlement and inspection work space using the common dismantlement and inspection work space and disposed in such a manner that insulatedly leading-out directions of the branch bus lines cross in order to balance voltage. Even if the three circuit breakers are disposed along axial directions of the main bus lines, the dismantlement and inspection work space can be also used for arranging of the branch bus lines, whereby an installation area for the gas-insulated switchgear device can be reduced in a juxtaposition direction of the circuit breakers.

3 Claims, 5 Drawing Sheets

GAS-INSULATED SWITCHGEAR DEVICE

CLAIM OF PRIORITY

The present application claims priority of Japanese application serial No. 2005-374304, filed on Dec. 27, 2005, the content of which is hereby incorporated by reference into this application.

FIELD OF THE INVENTION

The present invention relates to a gas-insulated switchgear device which is provided with a plurality of diameters comprised of three circuit breakers which are connected in series between a pair of main bus lines and, more particularly, to a gas-insulated switchgear device of an 3/2 circuit breaker system. In the present specification, the diameter consists of three sets of circuit breakers for three phases U, V and W wherein each of the circuit breaker sets comprises three circuit breakers, the circuit breakers in each phase being connected in series. Each of the circuit breakers consists of a circuit breaker and two disconnectors sandwiching the circuit breaker.

BACKGROUND OF THE INVENTION

Generally, a gas-insulated switchgear device comprises a circuit breaker having a grounded hermetic-vessel in which an electrically insulating gas such as an SF6 gas is filled, and a high voltage live part insulatedly disposed in the hermetic vessel, a disconnecting switch, a bus line, and the like. Since the gas-insulated switchgear devices are safe and highly reliable, and installation areas of the gas-insulated switchgear devices can be considerably reduced, in recent years, the gas-insulated switchgear devices have been used in various locations. Incidentally, a gas-insulated switchgear device of a 3/2 circuit breaker system has been employed in an important system.

A diameter is constructed by causing three circuit breakers, to both ends of which disconnecting switches are connected, to be connected between a pair of main bus lines, causing a rectifier, an earth switch and the like to be connected between the main bus lines, causing branch bus lines to be connected between the disconnecting switches, and causing end portions of the branch bus lines to be insulatedly led out by cable heads or bushings. Another diameter is also provided between the main bus lines. In the first diameter, the branch bus lines are led out toward the main bus lines or the branch bus lines are lead out toward the main bus lines. On the other hand, in the second diameter, the branch bus lines are led out toward the main bus lines or the branch bus lines are lead out toward the main bus lines. Thus, load balance is maintained.

The gas-insulated switchgear device is disclosed in Japanese Patent Application Laid-open No. Hei. 11-355923. In this gas-insulated switchgear device, main bus lines are spaced a predetermined distance apart from each other and disposed in substantially parallel to each other, three circuit breakers having disconnecting switches at both ends thereof are disposed in a direction bridging the main bus lines, and branch bus lines are connected between the disconnecting switches connected to the both ends of the circuit breakers. The branch bus lines are led out in a same direction, together with a diameter, so that there is a problem of concentration of load of the branch bus lines.

Moreover, Japanese Patent Application Laid-Open No. Hei. 11-355923 also discloses a gas-insulated switchgear device in which branch bus lines in one of diameters are led out in a direction opposite to each other and branch bus lines in the other of the diameters are led out in such direction as to cross.

However, when the gas-insulated switchgear device has the diameter in which the branch bus lines are led out in such directions as to cross, and the three circuit breakers are disposed in the direction bridging the pair of the main bus lines, so that a large installation area for the gas-insulated switchgear device is required in the direction bridging the main bus lines. In addition, the branch bus lines are disposed between the diameters, so that a large installation area is also required in axial directions of the main bus lines.

Moreover, in the conventional gas-insulated switchgear device, it is not taken into consideration that dismantlement and inspection work of the circuit breakers will be carried out at the time of the occurrence of accidents of the circuit breakers. If a work space for facilitating the dismantlement and inspection work of the circuit breakers is provided in the gas-insulated switchgear device, the gas-insulated switchgear device inevitably becomes a gas-insulated switchgear device having a large installation area. Therefore, it is feared that carrying-out of circuit breakers required to be dismantled and repaired must be performed by dismantling the main bus lines and then lifting up the main bus lines.

The present invention has been made with a view to overcoming the foregoing problems of the prior art gas-insulated switchgear device. It is therefore an object of the present invention to provide a gas-insulated switch gear device in which a space for dismantlement and inspection work which facilitates the dismantlement and inspection work of circuit breakers at the time of the occurrence of accidents of the circuit breakers can be sufficiently obtained and an installation area for the gas-insulated switchgear device can be reduced.

SUMMARY OF THE INVENTION

In accordance with the present invention, there is provided a gas-insulated switchgear device which comprises a pair of main bus lines spaced a predetermined distance apart from each other and disposed in substantially parallel to each other, a plurality of diameters each comprising three circuit breaker units connected in series, each of the circuit breaker units comprising a circuit breaker disposed in substantially parallel to axial directions of the main bus lines, and two disconnecting switches disposed in series in substantially parallel to the axial directions of the main bus lines so as to interpose the circuit breaker therebetween, the circuit breaker including a hermetic vessel, the disconnecting switches including hermetic vessels, a first connection bus line interconnecting circuit breakers of adjacent circuit breaker units, an auxiliary bus line, second and third connection bus lines interconnecting the first auxiliary bus line and disconnecting switches arranged at ends of the gas-insulated switchgear device, branch bus lines, and first and second connection sections provided among the three circuit breaker units for the first and second connection bus lines and the branch bus lines, wherein the branch bus lines are led out toward one of the main bus lines from the first connection section or being led out toward the other of the main bus lines from the second connection section so as to extend in a direction opposite to the leading-out direction of the branch bus lines from the first connection section, wherein axes of hermetic vessels of the circuit breakers are disposed at locations lower than axes of the first and second connection bus lines, wherein the disconnecting switches are disposed on the same axis as the first and second connection bus lines are disposed on, wherein the hermetic vessels of the circuit breakers and the hermetic vessels of the disconnecting switches are connected to each other, and wherein a space serving as at least one work space is provided under the second connection section; the work space having a length more than an axial length of hermetic vessels of the adjacent circuit breakers.

Ends of connection bus lines of the plurality of diameters may be connected to the main bus lines by second auxiliary bus line. Two circuit breakers adjacent to the work space may be disposed so as to be capable of being carried out in the work space.

In the gas-insulated switchgear device according to the present invention, the circuit breakers are disposed at the locations lower than the main bus lines and the connection bus lines and the disconnecting switches connected to the both ends of the circuit breakers are disposed at the same height as the connection bus lines and the main bus lines are disposed, so that the branch bus line of the second section between the branch bus line and the connection bus line can be lead out in the direction opposite to the leading-out direction of the branch bus line in the first connection section so as to cross a branch bus line of a connection bus line of a different diameter and can be connected to one of the main bus lines. The work space is provided under the branch bus line and the connection bus line, so that it can be obtained as a large-sized space (more than the length of the hermetic vessel of the circuit breaker). Therefore, dismantlement and carrying-out work of two of the three circuit breakers of the circuit breaker unit can be easily carried out utilizing the work space. That is, the dismantlement and carrying-out work of the circuit breakers can be easily carried out without dismantling the main bus lines or without lifting up the main bus lines. Incidentally, circuit breakers which are not adjacent can be pulled out and then carried out.

Moreover, a space above the work space is used as a space for use in arranging the branch bus lines, so that it is possible to provide a gas-insulated switchgear device in which a length of the gas-insulated switchgear device in the axial directions of the main bus lines can be reduced.

Moreover, the branch bus lines which are disposed above the work space in a diameter disposed on the side of one of the main bus lines are led out toward the other of the main bus lines, and the branch bus lines which are disposed above the work space in a diameter disposed on the side of the other of the main bus lines are led out toward the one of the main bus lines. Even if the respective branch bus lines are led out in different directions in order to maintain load balance, an installation area in the axial directions of the main bus lines for the gas-insulated switchgear device can be reduced.

These and other objects and many of the attendant advantages of the present invention will be readily appreciated as the same becomes better understood by reference to the following detailed description when considered in connection with the accompanying drawings.

DETAILED DESCRIPTION OF THE PREFERRED EMBODIMENTS

Embodiments according to the present invention will be discussed hereinafter with reference to the accompanying drawings.

Figure 2:
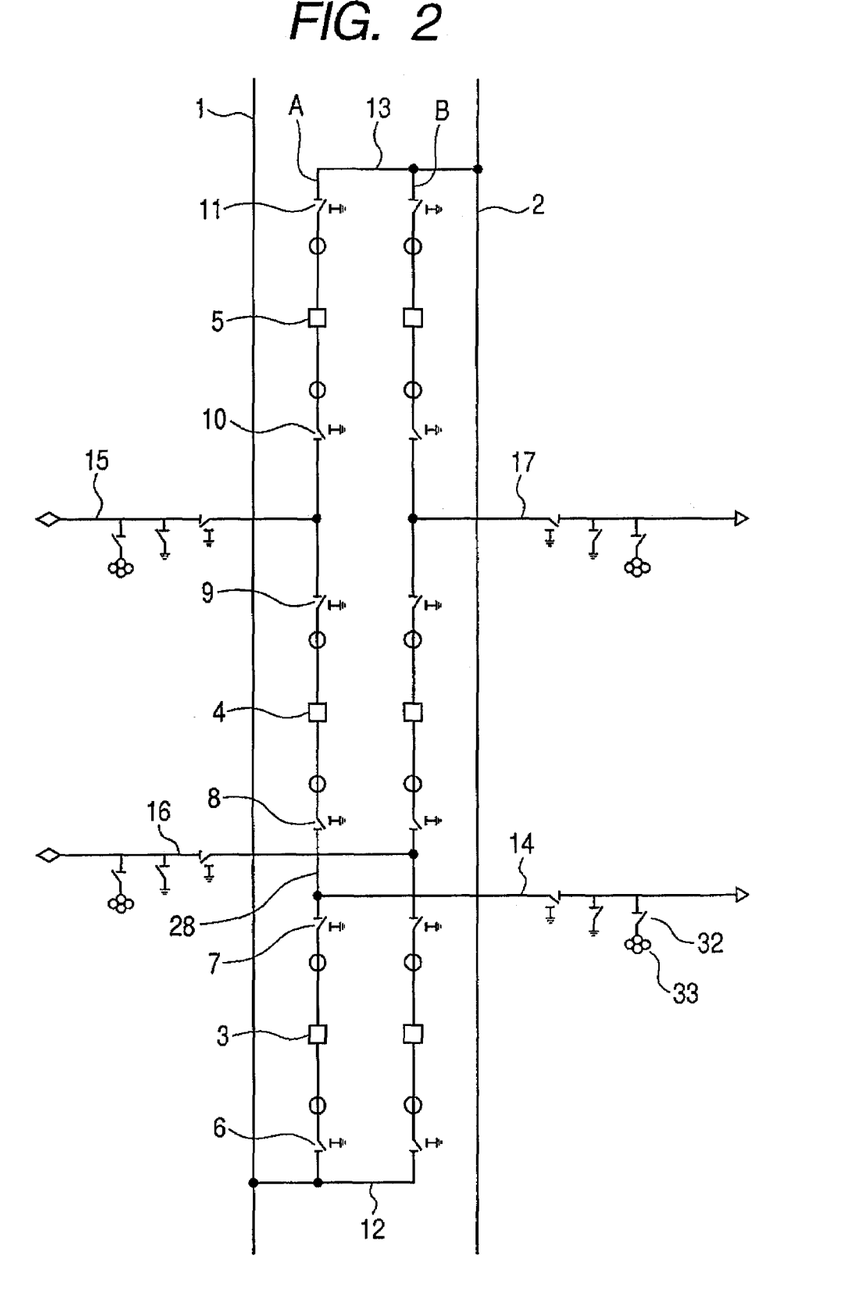
FIG. 2 is a single connection diagram of the gas-insulated switchgear device shown in FIG. 1.

FIG. 2 is a single connection diagram of a gas-insulated switchgear device according to a first embodiment of the present invention.

Main bus lines 1, 2 are spaced a predetermined distance apart from each other and disposed in substantially parallel to each other. In a space between these main bus lines 1, 2, two diameters A, B are provided. The diameter A which is adjacent to the main bus line 1 is constructed by causing three circuit breakers 3, 4, 5 to be spaced a predetermined distance apart from one other and disposed on a hypothetical vertical plane which passes a center line substantially parallel to the main bus line 1. An earth switch-mounted disconnecting switch 6 which is connected to one side of the circuit breaker 3, is connected to an auxiliary bus line 12 which is disposed so as to be substantially perpendicular to the main bus lines 1, 2 and connected to the main bus line 1. An earth switch-mounted disconnecting switch 7 which is connected to the other side of the circuit breaker 3, is connected to an earth switch-mounted disconnecting switch 8 which is connected to one side of the circuit breaker 4.

An earth switch-mounted disconnecting switch 9 which is connected to the other side of the circuit breaker 4, is connected to an earth switch-mounted disconnecting switch 10 which is connected to one side of the circuit breaker 5. An earth switch-mounted disconnecting switch 11 which is connected to the other side of the circuit breaker 5, is connected to an auxiliary bus line 13 which is disposed so as to be substantially perpendicular to the main bus lines 1, 2 and connected to the main bus line 2. The diameter B is constructed in the same manner as the diameter A is done, electrically connected between the auxiliary bus line 12 and the auxiliary bus line 13, and constructed by similarly causing three circuit breakers 3, 4, 5 to be spaced a predetermined distance apart from one other and disposed on the hypothetical vertical plane which passes the center line substantially parallel to the main bus lines 1, 2.

A branch bus line 14 is connected between the earth switch-mounted disconnecting switch 7 of the circuit breaker 3 and the earth switch-mounted disconnecting switch 8 of the circuit breaker 4 which are some of the elements constituting the diameter A. The branch bus line 14 is led out toward the main bus line 2. A branch bus line 15 is connected between the earth switch-mounted disconnecting switch 9 of the circuit breaker 4 and the earth switch-mounted disconnecting switch 10 of the circuit breaker 5 which are some of the elements constituting the diameter A. The branch bus line 15 is led out toward the main bus line 1. Also, a branch bus line 16 is connected between the earth switch-mounted disconnecting switch 7 of the circuit breaker 3 and the earth switch-mounted disconnecting switch 8 of the circuit breaker 4 which are some of the elements constituting the diameter B. The branch bus line 16 is led out toward the main bus line 1. A branch bus line 17 is connected between the earth switch-mounted disconnecting switch 9 of the circuit breaker 4 and the earth switch-mounted disconnecting switch 10 of the circuit breaker 5 which are some of the elements constituting the diameter B. The branch bus line 17 is led out toward the main bus line 2.

A direction in which the branch bus line 14 of the diameter A is led out, and a direction in which the branch bus line 15 of the diameter A is lead out, are opposite each other. Also, a direction in which the branch bus line 16 of the diameter B is led out, and a direction in which the branch bus line 17 of the diameter B is led out, are opposite each other. Furthermore, the leading-out direction of the branch bus line 14 of the diameter A and the leading-out direction of the branch bus line 15 of the diameter A are opposite to the leading-out direction of the branch bus line 16 of the diameter B and the leading-out direction of the branch bus line 17 of the diameter B, respectively. Thus, load balance is ensured.

Figure 3:
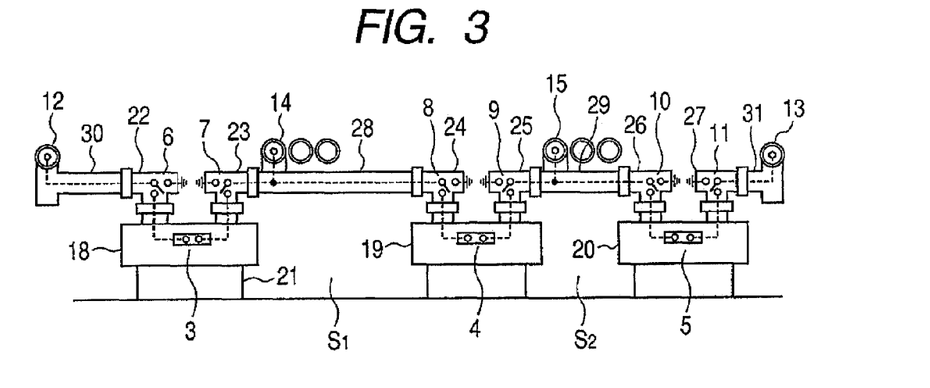
FIG. 3 is a schematic front view of the gas-insulated switchgear device shown in FIG. 1.

FIG. 3 is a schematic front view of the gas-insulated switchgear device in which only a circuit break unit for one phase in the diameter A of the gas-insulated switchgear device is shown.

The three circuit breakers 3, 4, 5 are provided in cylindrical hermetic-vessels 18, 19, 20 for the circuit breakers, respectively. The cylindrical hermetic-vessels 18, 19, 20 are disposed on a same axis substantially parallel to the main bus line 1, with central axes of the cylindrical hermetic-vessels 18, 19, 20 being aligned with the same axis, and are supported on bases 21. Each of the hermetic vessels 18, 19, 20 of the circuit breakers 3, 4, 5 is provided on an upper portion thereof with a branched section which comprises first and second vertically extending portions. Hermetic vessels 22, 23, 24, 25, 26, 27 for disconnecting switches, which are ones of elements constituting the earth switch-mounted disconnecting switches 6, 7, 8, 9, 10, 11 are horizontally connected to first and second vertically extending portions of a branched section of the hermetic vessel 18, first and second vertically extending portions of a branched section of the hermetic vessel 19, and first and second vertically extending portions of a branched section of the hermetic vessel 20, respectively.

Between the hermetic vessel 18 of the circuit breaker 3 and the hermetic vessel 19 of the circuit breaker 4 which is adjacent to the hermetic vessel 18, there is provided a space S1 which is to be used for dismantling and inspecting the circuit breakers 3, 4 alternately. A connection bus line 28 is disposed on a same axis of the hermetic vessels 23, 24 in a space between the hermetic vessels 23, 24, which positionally corresponds to the space Si between the hermetic vessels 18, 19. The connection bus line 28 interconnects the hermetic vessels 23, 24. Similarly, between the hermetic vessel 19 of the circuit breaker 4 and the hermetic vessel 20 of the circuit breaker 5 which is adjacent to the hermetic vessel 19, there is provided a space S2 which is to be used for dismantling and inspecting the circuit breaker 5. A connection bus line 29 is disposed on a same axis of the hermetic vessels 25, 26 in a space between the hermetic vessels 25, 26 which positionally corresponds to the space S2 between the hermetic vessels 25, 26. The connection bus line 29 interconnects the hermetic vessels 25, 26. The dismantlement and inspection work space S1 is designed so as to have a length more than an axial direction length of each of the hermetic vessels 18, 19 of the circuit breakers 3, 4 in order to facilitate both the dismantlement and inspection work of the adjacent to circuit breakers 3, 4 and carrying-out of them. Incidentally, the other space S2 may be used as a work space and is not necessarily used as the work space for the dismantling and carrying-out of the circuit breaker 5, since a work space for the circuit breaker 5 can be obtained on the right side of the hermetic vessel 20 for the circuit breaker 5. Therefore, it is unnecessary to design the space S2 so as to cause the space to have a large area.

The hermetic vessel 22 of the earth switch-mounted disconnecting switch 6 and the auxiliary bus line 12 are connected to each other by a connection bus line 30. The hermetic vessel 27 of the earth switch-mounted disconnecting switch 11 and the auxiliary bus line 13 are also connected to each other by a connection bus line 31. These connection bus lines 30, 31 are disposed on a same axis in the same manner as the connection bus lines 28, 29 are done. As seen from FIG. 1 which will be referenced below, the circuit breakers 3, 4, 5 are disposed on the hypothetical vertical plane which passes the center line substantially parallel to the main bus line 1.

While FIG. 3 illustrates the circuit breakers 3, 4, 5 for one phase in the diameter A of the gas-insulated switchgear device as discussed above, the circuit breakers 3, 4, 5 for three phases are disposed side by side in the illustrated example. Therefore, the respective phases are disposed on three hypothetical vertical planes which pass center lines substantially parallel to the main bus line 1. The diameter B is constructed in the same manner as the diameter A shown in FIG. 3 is done. In the diameter B, circuit breakers for three phases are disposed side by side.

Between the hermetic vessel 18 of the circuit breaker 3 and the hermetic vessel 19 of the circuit breaker 4, there is provided the space S1 for dismantlement and inspection work, which is to be used for dismantling and inspecting the circuit breakers 3, 4 alternately. The connection bus 28 which is provided so as to positionally correspond to the space for dismantlement and inspection work is disposed on a center axis which is located above the center axis of the circuit breakers 3, 4, 5.

Therefore, the space S1 to be used for dismantlement and inspection work can be provided under the connection bus line 28 without being interfered with the connection bus line 28. Similarly, the space S2 to be used for dismantling and inspecting the circuit breaker 5 is provided between the hermetic vessel 19 of the circuit breaker 4 and the hermetic vessel 20 of the circuit breaker 5. The connection bus 29 which is provided so as to positionally correspond to the space for dismantlement and inspection work is disposed on a central axis which is located above the center axis of the circuit breakers 3, 4, 5. Therefore, the space S2 for dismantlement and inspection work can be provided under the connection bus line 29 without being interfered with the connection bus line 29.

The dismantling and inspecting of the circuit breaker 5 is carried out utilizing the space S2 for dismantlement and inspection work provided under the connection bus line 29. However, the dismantling and inspecting of the circuit breaker 5 may be carried out utilizing a space which is provided under the connection bus line 31 of the circuit breaker 5. In this case, the circuit breaker 4 and the circuit breaker 5 can be disposed further adjacent to each other. Also, the space S2 between the hermetic vessel 19 of the circuit breaker 4 and the hermetic vessel 20 of the circuit breaker 5 may be used as a space for dismantling and inspecting the circuit breakers 4, 5 alternately, and a space under the connection bus 30 may be used as a space for dismantling and inspecting the circuit breaker 3 only. Therefore, in a gas-insulated switchgear device of an 3/2 circuit breaker system which employs the three circuit breakers 3, 4, 5, a common space to be used for dismantlement and inspection work may be provided between two arbitrary circuit breakers of the three circuit breakers 3, 4, 5 which are adjacent to each other.

The arranging of the branch bus lines 14, 15 above the spaces S1, S2 by also using the spaces S1, S2 to be used for dismantling and inspecting the circuit breakers 3, 4, 5. In the illustrated example, the arranging of the branch bus line 14 above the common space S1 for dismantlement and inspection work between the adjacent circuit breakers 3, 4, is carried out by also utilizing the space S1. The arranging of the branch bus 15 above the space S2 to be used for dismantling and inspecting the circuit breaker 5 only is carried out by also utilizing the space S2. Therefore, even if the three circuit breakers 3, 4, 5 are disposed along the axial direction of the main bus lines 1, 2, the arranging of the branch bus lines 14, 15 can be carried out utilizing the spaces S1, S2 to be used for dismantlement and inspection work, so that the installation area for the circuit breakers in a juxtaposition direction thereof can be reduced.

Figure 1:
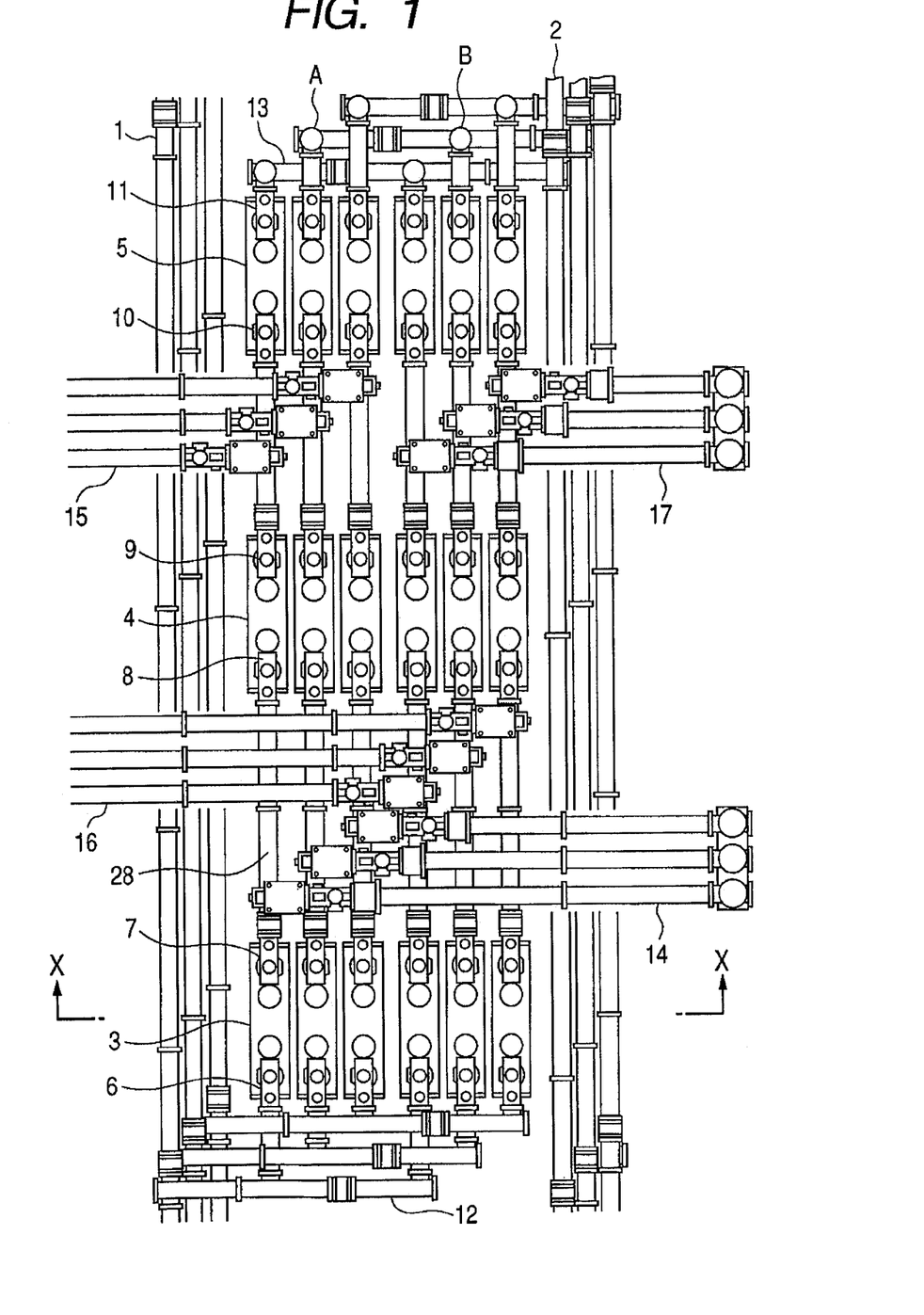
FIG. 1 is a schematic plan view of a gas-insulated switchgear device according to a first embodiment of the present invention.

FIG. 1 is a schematic plan view of a gas-insulated switchgear device according to a first embodiment of the present invention, which corresponds to the connection diagram of FIG. 2 and illustrates the gas-insulated switchgear device employing the two diameters A, B. In the illustrated example, a direction which bridges the main buss lines 1, 2 shall be defined as a juxtaposition direction and the three circuit breakers 3, 4, 5 for three phases are disposed along axial directions of the main bus lines 1, 2. Therefore, as discussed above, the spaces for use in dismantling and inspecting the circuit breakers 3, 4 alternately are collectively provided between the circuit breakers 3, 4 of the diameters A, B. Moreover, as discussed above, the spaces for use in dismantling and inspecting the circuit breakers 5 are collectively provided between the circuit breakers 4, 5 of the diameters A, B.

Above the spaces for use in dismantling and inspecting the circuit breakers 3, 4, which are collectively provided between the circuit breakers 3, 4, the branch bus lines 14, 16 are disposed so as to be substantially perpendicular to the main bus lines 1, 2. Moreover, above the spaces for use in dismantling and inspecting the circuit breakers 5, which are collectively provided between the circuit breakers 4, 5, the branch bus lines 15, 17 are disposed so as to be substantially perpendicular to the main bus lines 1, 2. The branch bus line 14 is led out toward the main bus line 2. The branch bus 16 is led out toward the main bus line 1. The branch bus line 15 is led out toward the main bus line 1. The branch bus line 17 is led out toward the main bus line 2.

Figure 4:
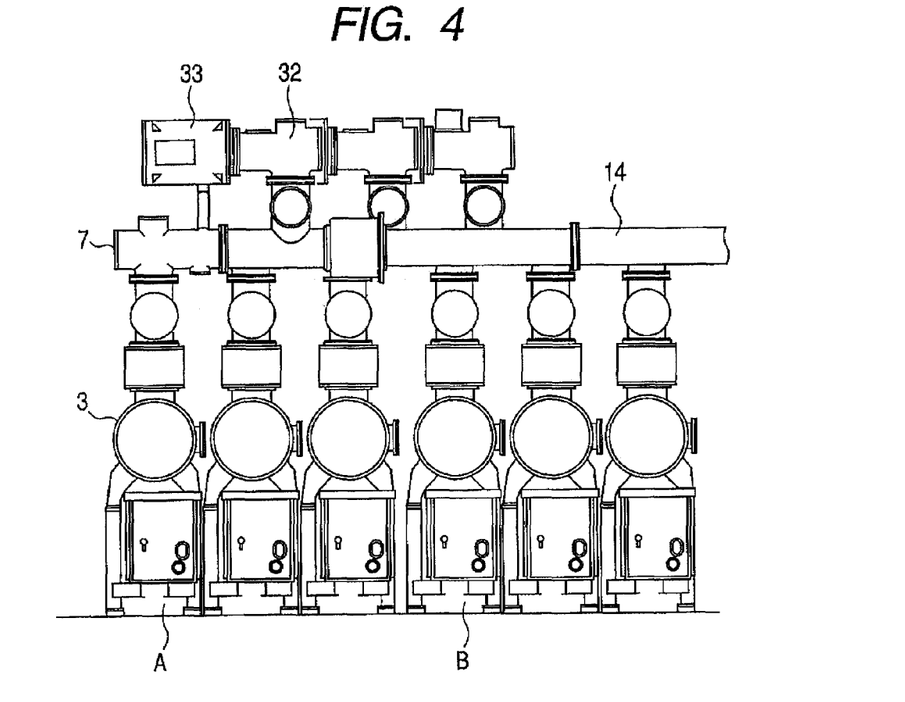
FIG. 4 is a schematic side view of the gas-insulated switchgear device of FIG. 1, taken along a line X-X in FIG. 1.

FIG. 4 is a schematic sectional view of the gas-insulated switchgear device, taken along a line X-X in FIG. 1. The respective circuit breakers 3 of the diameters A, B for the three phases are disposed side by side. The branch bus line 14 which is located above the respective circuit breakers 3 and extends in the direction bridging the main bus lines 1, 2 is connected to the hermetic vessel 23 of the earth switch-mounted disconnecting circuit 7 connected to the upper portions of the circuit breakers 3 of the diameter A. As shown in the connection diagram of FIG. 2, an instrument voltage-transformer (VT) and the like are connected to a middle portion of the branch bus 14 through the disconnecting circuit 32. However, they may be omitted depending upon a circuit structure.

In the gas-insulated constructed as discussed above, further making use of the spaces which are provided for use in dismantling and inspecting the circuit breakers 3, 4, 5, the branch bus lines 14, 15, 16, 17 are disposed in the spaces above the dismantlement and inspection work spaces. In the illustrated example, further making use of the common spaces provided between the adjacent circuit breakers 3, 4 for use in dismantling and inspecting the circuit breakers 3, 4, the branch bus lines 14, 16 for the three phases are disposed in the common spaces and, further making use of the spaces for use in dismantling and inspecting the circuit breakers 5, the branch bus lines 15, 17 for the three phases are disposed in the spaces for use in dismantling and inspecting the circuit breakers 5. Therefore, even if the three circuit breakers 3, 4, 5 are disposed along the axial directions of the main bus lines 1, 2, the dismantlement and inspection work spaces can be also used in order to carry out the arranging of the branch bus lines 14 to 17, so that an installation area for the circuit breakers in the juxtaposition direction of the circuit breakers can be reduced.

Particularly, the dismantlement and inspection work spaces for use in dismantling and inspecting the circuit breakers 3, 4, 5 are provided between the circuit breakers 3 and the circuit breakers 4 and between the circuit breakers 4 and the circuit breakers 5. These spaces are indispensable spaces. Further making use of the dismantlement and inspection work spaces, the branch bus lines 14, 16 are disposed in spaces which are located above the dismantlement and inspection work spaces and do not prevent performing of the dismantlement and inspection work. That is, further making use of the common dismantlement and inspection work spaces provided between the adjacent circuit breakers 3, 4, the branch bus lines 14, 16 which, in order to balance the voltage, extend in a direction which traverses the insulatedly leading-out direction, and are connected to the connecting conductor 28 at locations shifted relative to each other in the axial directions of the main buses 1, 2, are disposed in the spaces above the common dismantlement and inspection work spaces between the circuit breakers 3, 4. Therefore, even if the three circuit breakers 3, 4, 5 are disposed along the axial directions of the main bus lines 1, 2, the dismantlement and inspection work spaces between the circuit breakers 3, 4 and between the circuit breakers 4, 5 can be also used in order to carry out the arranging of the branch bus lines 14, 16, so that as compared to a case where spaces for use in dismantlement and inspection work only are provided, it is possible to cause the installation area for the circuit breakers in the juxtaposition direction of the circuit breakers to be reduced.

Moreover, in the gas-insulated switchgear device of the 3/2 circuit breaker system, the three circuit breakers 3, 4, 5 are disposed on the substantially same center axis, so that the installation area must be obtained to a certain degree in the axial direction. In the prior art gas-insulated switchgear device, the three circuit breakers are disposed on a center axis bridging the main bus lines and the diameters for three or more phases are disposed in center axial directions of the main bus lines, so that large installation areas must be obtained in both the direction bridging the main bus lines and the axial directions. However, in the above-mentioned gas-insulated switchgear device according to the first embodiment of the present invention, the three circuit breakers 3 to 5 are disposed in the axial directions of the main bus lines and the diameters for three or more phases are disposed in the direction bridging the main bus lines, so that, particularly, a space between the main bus lines can be reduced. Thus, according to the present invention, it is possible to obtain the gas-insulated switchgear device in which the installation area is reduced.

In the above-mentioned gas-insulated switchgear device, the branch bus lines 14, 17 shown in FIG. 1 are led out through cable heads and then connected to cables. On the other hand, the branch bus lines 15, 16 are led out through bushings and then connected to power-transmission lines, for example. Insulation on the side of cables is obtained by coatings of the cables. On the contrary, a relatively large aerial-insulation distance is required to be provided on the side of the bushings. Therefore, connecting between the connection bus lines 28, 29 and the branch bus lines 14 to 17 can be carried out at various locations in the axial directions of the connection bus lines 28, 29, taking into consideration the aerial-insulation distances between the bushings. For example, if the arranging positions of the branch bus lines 14, 16 are changed in the axial directions of the main bus lines 1, 2, it is possible to easily obtain enough insulation distances between the bushings for the three phases to which the branch bus line 16 is connected, and the bushings for the three phases to which the branch bus line 15 is connected.

Moreover, in the gas-insulated switchgear device shown in FIG. 1, an axial length of the connection bus line 28 interconnecting the earth switch-mounted disconnecting circuit 7 and the earth switch-mounted disconnecting circuit 8 is substantially set on the basis of arranging of the branch bus line 14 and the branch bus line 16 and the dismantlement and inspection work space provided between the circuit breaker 3 and the circuit breaker 4 is set so as to become slightly large. However, if one of the branch bus lines 14, 16 is disposed above the connection bus line 28 and the other of the branch bus lines 14, 16 is disposed under the connection bus 28 and, for the branch bus line 16 for the three phases, an interrelation distance is preset so as to become large as compared to the illustrated example, taking into consideration the aerial insulation distances between the bushings as discussed above, it is possible to effectively use the interrelation distance while causing the branch bus lines 14, 16 to be shifted relative to each other in the axial directions of the main bus lines 1, 2, and causing the axial length of the connection bus line 28 to be shortened so as to coincide with the dismantlement and inspection work space required between the circuit breakers 3, 4.

However, in this case, the branch bus line 14 or the branch bus line 16 which is disposed under the connection bus line 28 is required to be supported at a height which does not prevent the dismantlement and inspection work of the circuit breakers 3, 4. Moreover, according to this concept, both the branch bus line 14 and the branch bus line 16 may be disposed under the connection bus line 28 so as to be located at a height which does not prevent the dismantlement and inspection work of the circuit breakers 3, 4, and the branch bus lines 14, 16 may be shifted in the axial directions of the main bus lines 1, 2 in such a manner that the respective phases of the branch bus lines 14 are interposed between the respective phases of the branch bus lines 16 in which distances among the three phases are slightly extended.

Moreover, according to the same requirements, the branch bus lines 15, 17 may be vertically disposed through the connection bus line 29 or may be disposed under the connection bus line 29. Particularly, the dismantlement and inspection work of the circuit breaker 5 can be also carried out on the side of the auxiliary bus line 13, so that the dismantlement and inspection work space between the circuit breakers 4, 5 is not always required to be provided. Therefore, the space under the connection bus line 29 may be used as a space in which the branch bus lines 15, 17 are disposed.

Figure 5:
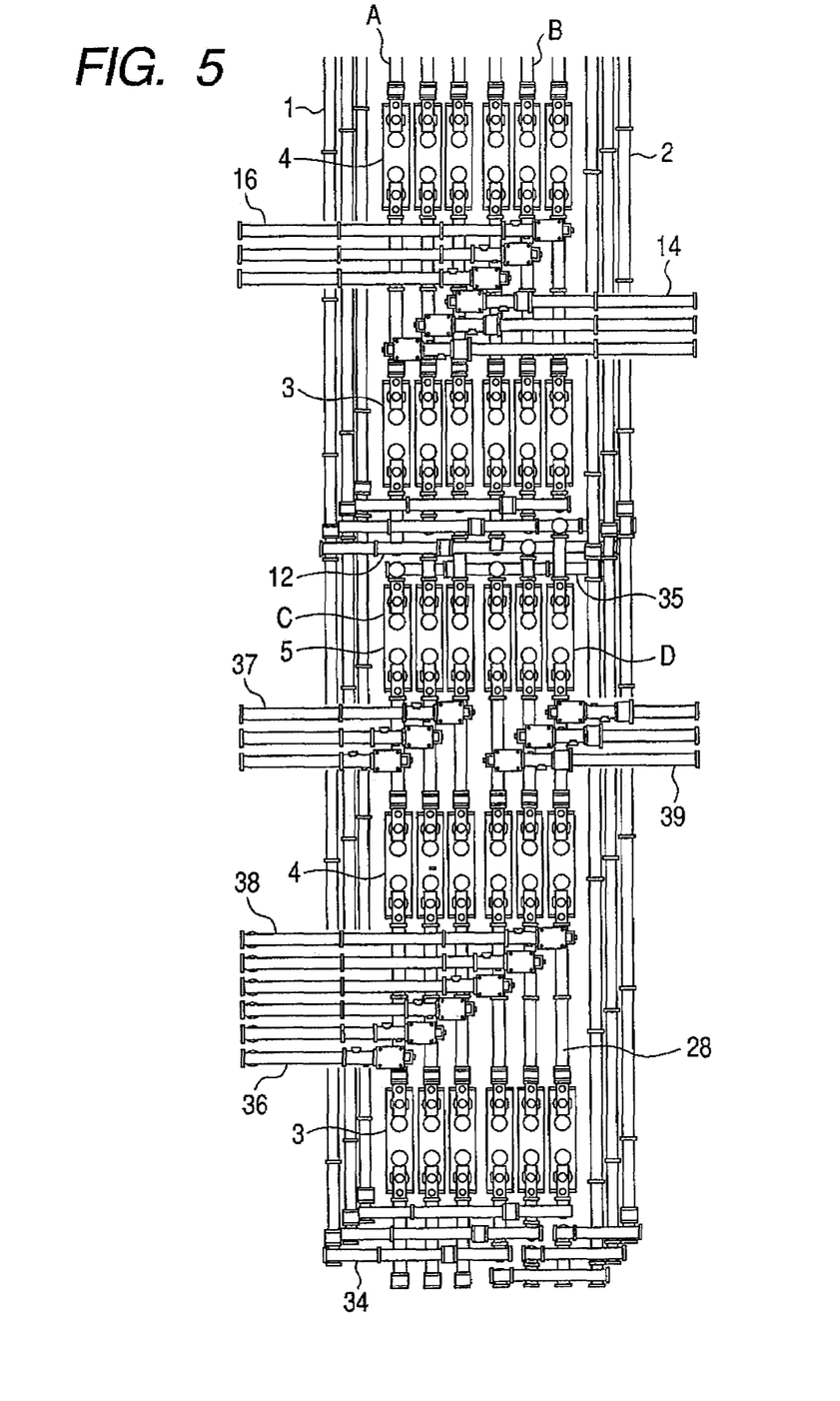
FIG. 5 is a schematic plan view of a gas-insulated switchgear device according to a second embodiment of the present invention.

FIG. 5 is a plan view of a gas-insulated switchgear device according to a second embodiment of the present invention.

In this example, diameters C, D are added to the gas-insulated switchgear device of FIG. 1. In FIG. 5, elements which are equivalent to the elements of the gas-insulated switchgear device of FIG. 1 are denoted by the same reference numerals. The main bus lines 1, 2 are spaced a predetermined distance apart from each other and disposed in substantially parallel to each other. The three circuit breakers 3, 4, 5 of the diameter A partially shown in FIG. 5 are disposed along the axial directions of the main bus lines 1, 2. One ends of the three circuit breakers 3, 4, 5 are connected to the main bus line 1 through the auxiliary bus 12. Three circuit breakers 3, 4, 5 of the diameter B are juxtaposed with the three circuit breakers 3, 4, 5 of the diameter A. The branch bus line 14 interconnecting the circuit breakers 3, 4 of the diameter B is led out toward the main bus line 1 like the branch bus line 14 interconnecting the circuit breakers 3, 4 of the diameter A. A branch bus line 16 interconnecting the circuit breakers 3, 4 of the diameter B is lead out toward the main bus line 1.

The added diameter C comprises three circuit breakers 3, 4, 5 which are disposed side by side in a same direction so as to be adjacent to the circuit breakers 3 of the diameter A. One end of the diameter C is connected to the main bus line 1 through an auxiliary bus line 34. The other end of the diameter C is connected to the main bus line 2 through an auxiliary bus line 35. Moreover, the added diameter D comprises three circuit breakers 3, 4, 5 which are juxtaposed with the circuit breakers 3, 4, 5 of the diameter C. One end of the diameter D is connected to the main bus line 1 through the auxiliary bus line 34. The other end of the diameter D is connected to the main bus line 2 through the auxiliary bus line 35.

A branch bus line 36 which interconnects the circuit breakers 3, 4 of the diameter C is led out toward the main bus line 1. A branch bus line 37 which interconnects the circuit breakers 4, 5 of the diameter C is also led out toward the main bus line 1. A branch bus line 38 which interconnects the circuit breakers 3, 4 of the diameter D is led out toward the main bus line 1. A branch bus line 39 which interconnects the circuit breakers 4, 5 of the diameter D is led out toward the main bus line 2.

Figure 6:
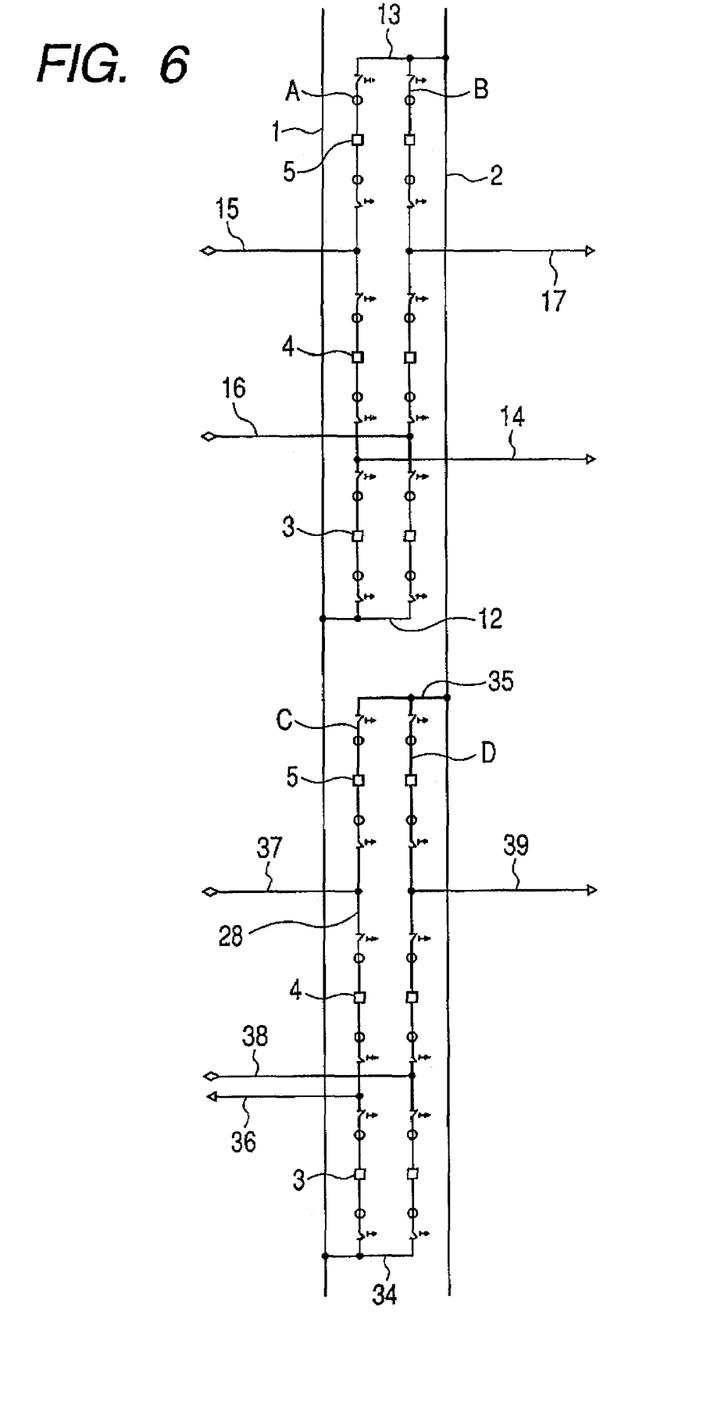
FIG. 6 is a single phase connection diagram of the gas-insulated switchgear device shown in FIG. 5.

FIG. 6 is a single connection diameter of the gas-insulated switchgear device of FIG. 5.

The main bus lines 1, 2 are spaced the predetermined distance away from each other and disposed in substantially parallel to each other. The diameters A, B which are shown in FIG. 1 are provided between the main bus lines 1, 2. One ends of the diameters A, B are connected to the main bus line 1 through the auxiliary bus line 12. As discussed above, the dismantlement and inspection work space for the circuit breakers 3, 4 is provided between the circuit breakers 3, 4. A space under the auxiliary bus line 12 is not used for dismantling and inspecting the circuit breaker 3, so that the auxiliary bus line 35 which causes the ends of the added diameters C, D to be connected to the main bus line 2 is disposed in the space under the auxiliary bus line 12.

The auxiliary bus line 12 and the auxiliary bus line 35 are disposed so as to be vertically spaced apart from each other. This makes it possible to cause the axial lengths of the main bus lines 1, 2 to be shortened. Using the dismantlement and inspection work space provided between the circuit breakers 3, 4, the branch bus lines 14, 16 are located at heights which do not prevent the dismantlement and inspection work of the circuit breakers 3, 4. Therefore, like the first embodiment, the second embodiment can effectively make use of spaces. Thus, the gas-insulated switchgear device in which the axial lengths of the main bus lines 1, 2 can be reduced and which is further small-sized can be obtained.

The added diameter C comprises the three circuit breakers 3, 4, 5 for three phases which are disposed on the substantially same axis as the circuit breakers 3, 4, 5 of the diameter A are disposed. The one end of the diameter C is connected to the main bus line 2 through the auxiliary bus line 35. The other end of the diameter C is connected to the main bus line 1 through the auxiliary bus line 34. Moreover, the added diameter D is juxtaposed with the diameter C and comprises the circuit breakers 3, 4, 5 for the three phases which are disposed in the same manner as the circuit breakers 3, 4, 5 of the diameter C are done. The one end of the diameter D is connected to the main bus line 2 through the auxiliary bus line 35.

The other end of the diameter D is connected to the main bus line 1 through the auxiliary bus line 34.

In each of the diameters C, D, a dismantlement and inspection work space for use in dismantling and inspecting the circuit breaker 5 is provided between the circuit breakers 4, 5. The branch bus line 37 and the branch bus line 39 are disposed above the space between the circuit breakers 4, 5 so as to be located at heights which do not prevent the dismantlement and inspection work of the circuit breaker 5. The branch bus line 37 and the branch bus line 39 are led out in different directions. This construction for the circuit breakers 4, 5 of each of the diameters C, D is identical to that for the circuit breakers 4, 5 of each of the diameters A, B.

Moreover, in the diameters C, D, spaces for use in dismantling and inspecting the circuit breakers 3, 4 are collectively provided between the circuit breakers 3 and the circuit breakers 4. The branch bus lines 36, 38 are provided in spaces above the dismantlement and inspection work spaces and disposed at heights which do not prevent the dismantlement and inspection work of the circuit breakers 3, 4. This construction is substantially similar to the construction for the breakers 3, 4 of the diameters A, B in the first embodiment. The branch bus lines 14, 16 of the second embodiment are also constructed in the substantially same manner as the branch bus lines 14, 16 of the first embodiment except the leading-out directions of the branch bus lines. In the second embodiment, providing of the branch bus lines 36, 38 can be also carried out using the dismantlement and inspection work space provided between the circuit breakers 3, 4. Accordingly, the gas-insulated switchgear device in the axial directions of the main bus lines 1,2 can be reduced.

In the second embodiment, when the main bus lines 1, 2 are spaced the predetermined distance away from each other and disposed in substantially parallel to each other, and a plurality of the diameters which each comprises the three circuit breakers 3, 4, 5 disposed in the axial directions of the main bus lines 1, 2, at least one of the diameters is juxtaposed with the direction bridging the main bus lines 1, 2. Thus, the gas-insulated switchgear device in which an installation area in a space between the main bus lines 1, 2 is reduced can be provided. Moreover, the common dismantlement and inspection work space is provided between the circuit breakers 3, 4 for use in dismantling and inspecting the circuit breakers 3, 4. The branch bus lines 14, 16 or the branch bus lines 36, 38 which do not extend in a counter direction in order to balance the voltage are provided in the space above the common dismantlement and inspection work space and disposed at the height which does not prevent the dismantlement and inspection work. Therefore, the providing of the branch bus lines can be carried out using the dismantlement and inspection work space, thus making it possible to provide the gas-insulated switchgear device in which the axial lengths of the main bus lines 1, 2 are reduced.

Moreover, in the second embodiment, the two diameters A, B are disposed side by side in the direction bridging the main bus lines 1, 2 and, when the diameters C, D are provided, the diameters C, D are disposed so as to be shifted from the diameters A, B in the axial directions of the main bus lines 1, 2. Therefore, a balance is maintained between the dismantlement and inspection work space, provided between the circuit breakers 3, 4 disposed in the axial directions of the main bus lines 1, 2, and the branch bus lines 14, 16 or is maintained between the dismantlement and inspection work space, provided between the circuit breakers 3, 4, and the branch bus lines 36, 38, and the both can be effectively provided in the space. Thus, it is possible to provide the gas-insulated switchgear device in which the axial lengths of the main bus lines 1, 2 are reduced. Incidentally, it is conceivable that three or more diameters are disposed side by side in the direction bridging the main bus lines 1, 2. However, in this case, three branch bus lines are inevitably disposed between the circuit breakers 3, 4, so that the balance between the dismantlement and inspection work space, provided between the circuit breakers 3, 4, and the branch bus lines 36, 38 is not maintained, and the space between the circuit breakers 3, 4 must be set so as to become excessively large in order to allow the leading-out of the three branch bus lines. This result in a gas-insulated switchgear device in which the axial lengths of the main bus lines 1, 2 become slightly large.

Moreover, in each of the first and second embodiments, the branch bus lines 15, 17 or the branch bus lines 37, 39 which are led out from the space between the circuit breakers 4, 5 extend in different directions relative to each other, so that the space between the circuit breakers 4, 5 is set so as to become small. If the branch bus lines 15, 17 or the branch bus lines 37, 39 are led out so as to cross, for example, the space between the circuit breakers 4, 5 may be used as a common space for use in dismantling and inspecting the circuit breakers 4, 5.

Moreover, in each of the first and second embodiment, the three circuit breakers 3, 4, 5 are not spaced at an equal distance away from one another and a distance between the circuit breakers 3, 4 is larger than that between the circuit breakers 4, 5, so that the larger space can be used as a common space for use in dismantling and inspecting the circuit breakers 3, 4. The branch bus lines 14, 16 or the branch bus lines 36, 39 can be provided at locations shifted in the axial directions of the main bus lines 1, 2, with utilizing the dismantlement and inspection work space. Thus, it is possible to provide the gas-insulated switchgear device in which a space in which the three circuit breakers 3, 4, 5 are disposed, namely, the axial lengths of the main bus lines 1, 2 are reduced.

While the earth switch-mounted disconnecting switches 6 to 11 are provided at the both ends of the respective circuit breakers 3 to 5 in each of the gas-insulated switchgear devices according to the first and second embodiments, the gas-insulated switchgear devices may comprise the circuit breakers 3 to 5 and the earth switches which are constructed independently from one another.

It will thus be seen that the objects set forth above, and those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

What is claimed is:

1. A gas-insulated switchgear device comprising:
 a pair of main bus lines spaced a predetermined distance apart from each other and disposed in substantially parallel to each other;
 a plurality of diameters each comprising three circuit breaker units connected in series;
 each of the circuit breaker units comprising a circuit breaker disposed in substantially parallel to axial directions of the main bus lines, and two disconnecting switches disposed in series in substantially parallel to the axial directions of the main bus lines so as to interpose the circuit breaker therebetween;
 the circuit breaker including a hermetic vessel;
 the disconnecting switches including hermetic vessels;
 a first connection bus line interconnecting circuit breakers of adjacent circuit breaker units;
 an auxiliary bus line;

second and third connection bus lines interconnecting the first auxiliary bus line and disconnecting switches arranged at ends of the gas-insulated switchgear device; branch bus lines; and first and second connection sections provided among the three circuit breaker units for the first and second connection bus lines and the branch bus lines;

wherein the branch bus lines are led out toward one of the main bus lines from the first connection section or being led out toward the other of the main bus lines from the second connection section so as to extend in a direction opposite to the leading-out direction of the branch bus lines from the first connection section; wherein axes of hermetic vessels of the circuit breakers are disposed at locations lower than axes of the first and second connection bus lines; wherein the disconnecting switches are disposed on the same axis as the first and second connection bus lines are disposed on; wherein the hermetic vessels of the circuit breakers and the hermetic vessels of the disconnecting switches are connected to each other; and wherein a space serving as at least one work space is provided under the second connection section; the work space having a length more than an axial length of hermetic vessels of the adjacent circuit breakers.

2. A gas-insulated switchgear device according to claim 1, wherein ends of connection bus lines of the plurality of diameters are connected to the main bus lines by second auxiliary bus line.

3. A gas-insulated switchgear device according to claim 1, wherein two circuit breakers adjacent to the work space are disposed so as to be capable of being carried out in the work space.

* * * * *